(12) United States Patent
Zheng et al.

(10) Patent No.: US 12,504,623 B2
(45) Date of Patent: Dec. 23, 2025

(54) DISPLAY PANEL AND DISPLAY APPARATUS

(71) Applicant: KunShan Go-Visionox Opto-Electronics Co., Ltd., Kunshan Suzhou (CN)

(72) Inventors: Tianchun Zheng, Kunshan Suzhou (CN); Yi Zheng, Kunshan Suzhou (CN); Chaochi Peng, Kunshan Suzhou (CN); Pengle Dang, Kunshan Suzhou (CN); Minghui Wang, Kunshan Suzhou (CN)

(73) Assignee: KunShan Go-Visionox Opto-Electronics Co., Ltd., Kunshan (CN)

( * ) Notice: Subject to any disclaimer, the term of this patent is extended or adjusted under 35 U.S.C. 154(b) by 769 days.

(21) Appl. No.: 17/689,133

(22) Filed: Mar. 8, 2022

(65) Prior Publication Data

US 2022/0190299 A1    Jun. 16, 2022

Related U.S. Application Data

(63) Continuation of application No. PCT/CN2021/070173, filed on Jan. 4, 2021.

(30) Foreign Application Priority Data

Feb. 20, 2020    (CN) .......................... 202020189787.1

(51) Int. Cl.
*G02B 27/00*    (2006.01)
*H10K 59/65*    (2023.01)
*H10K 59/80*    (2023.01)

(52) U.S. Cl.
CPC ......... *G02B 27/00* (2013.01); *G02B 27/0025* (2013.01); *G02B 27/0018* (2013.01);
(Continued)

(58) Field of Classification Search
None
See application file for complete search history.

(56) References Cited

U.S. PATENT DOCUMENTS

| 10,627,556 B2 * | 4/2020 | Hung ................... H10K 59/878 |
| 2016/0018923 A1 * | 1/2016 | Zhang ................... G06F 3/0445 |
| | | 345/87 |

(Continued)

FOREIGN PATENT DOCUMENTS

| CN | 106530965 A | 3/2017 |
| CN | 105374844 B | 7/2018 |

(Continued)

OTHER PUBLICATIONS

International Search Report for Application No. PCT/CN2021/070173 mailed on Mar. 23, 2021.

*Primary Examiner* — Stephone B Allen
*Assistant Examiner* — Tamara Y. Washington
(74) *Attorney, Agent, or Firm* — Maier & Maier, PLLC

(57) ABSTRACT

A display panel and a display apparatus. The display panel includes: a screen body including a display surface and a non-display surface opposite to the display surface; a support film disposed on a side of the screen body having the non-display surface; a composite tape disposed on a side of support film away from the screen body; a first reflective film disposed in a same layer with the support film and/or the composite tape. A position of the first reflective film corresponds to a perforated region of the display panel. The position of the perforated region corresponds to a position of an external optical or acoustic module. A possibility of a Mura phenomenon occurring on an image displayed on the display panel at a position corresponding to the perforated region may be reduced.

19 Claims, 3 Drawing Sheets

(52) U.S. Cl.
CPC ............. *H10K 59/65* (2023.02); *H10K 59/87* (2023.02); *H10K 59/8791* (2023.02)

(56) References Cited

U.S. PATENT DOCUMENTS

| | | | | |
|---|---|---|---|---|
| 2017/0064173 | A1* | 3/2017 | Yoo | H04N 23/55 |
| 2018/0040675 | A1* | 2/2018 | Zeng | H10K 50/805 |
| 2019/0165316 | A1* | 5/2019 | An | H10K 59/38 |
| 2019/0271874 | A1* | 9/2019 | Fu | H10K 77/111 |
| 2021/0223902 | A1* | 7/2021 | Wang | G06F 3/04184 |

FOREIGN PATENT DOCUMENTS

| | | | |
|---|---|---|---|
| CN | 108885376 | A | 11/2018 |
| CN | 208862900 | U | 5/2019 |
| CN | 109993117 | A | 7/2019 |
| CN | 110738939 | A | 1/2020 |
| CN | 211480033 | U | 9/2020 |

\* cited by examiner

DISPLAY PANEL AND DISPLAY APPARATUS

CROSS REFERENCE TO RELATED APPLICATIONS

The present application is a continuation-application of International (PCT) Patent Application No. PCT/CN2021/070173, filed on Jan. 4, 2021, which claims the priority of Chinese Patent Application No. 202020189787.1, filed on Feb. 20, 2020, in China National Intellectual Property Administration, the entire contents of which are hereby incorporated by reference in their entireties.

TECHNICAL FIELD

The present disclosure relates to the field of displaying, and in particular to a display panel and a display apparatus.

BACKGROUND

In the art, a display panel generally includes a plurality of perforated regions, such as, an perforated region corresponding to an earpiece, an perforated region corresponding to a camera, an perforated region corresponding to a fingerprint recognition module, and the like. Self-illumination of the display panel may enable quality of an image displayed on a region of the display panel corresponding to the perforated regions to show a Mura dark phenomenon.

SUMMARY OF THE DISCLOSURE

The present disclosure provides a display panel and a display apparatus, which may reduce a probability of an image displayed on a region of the display panel corresponding to the perforated regions showing the Mura phenomenon.

According to a first aspect of the present disclosure, a display panel is provided and includes: a screen body, comprising a display surface and a non-display surface opposite to the display surface; a support film, disposed on a side of the screen body having the non-display surface; a composite tape, disposed on a side of the support film away from the screen body; and a first reflective film, disposed on a same layer as the support film, wherein an orthographic projection of the first reflective film on the screen body covers an orthographic projection of an perforated region of the display panel on the screen body, and the perforated region is configured at a position corresponding to a position of an external optical module or an external acoustic module.

According to a second aspect of the present disclosure, a display apparatus is provided and includes: the display panel according to any one of the above embodiments; and an optical module or an acoustic module. The display panel is provided with a perforated region; and the optical module or the acoustic module are provided at a position corresponding to the perforated region.

According to the present disclosure, the display panel includes a screen body, a support film and a composite tape, and the screen body, the support film and the composite tape are laminated successively. A first reflective film is configured in a same layer with the support film and/or the composite tape. An orthographic projection of the first reflective film on the screen body covers an orthographic projection of the perforated region of the display panel on the screen body. A refractive index of the display panel at the location of the aperture area is different from a refractive index of air at the location of the aperture area. When the screen body is self-illuminating, a large amount of reflected light may be generated at an interface between the display panel and the air at the perforated region. The reflected light has a great impact on the quality of the image displayed on the screen body, such that a region of the image corresponding to the perforated region of the display panel may be dark. In the present disclosure, the first reflective film is configured at a location corresponding to the perforated region. The first reflective film may reduce the reflected light caused by the light emitted by the screen body. In this way, an impact on the quality of the image displayed on the location of the perforated region caused by the light emitted by the screen body may be reduced, and a probability of the Mura dark phenomenon may be reduced. In the present disclosure, less material may be required for manufacturing the first reflective film, the manufacturing cost may be low.

DETAILED DESCRIPTION

Technical solutions in the embodiments of the present disclosure will be clearly and completely described by referring to the accompanying drawings in the embodiments of the present disclosure. Obviously, the described embodiments are only a part of, but not all of, the embodiments of the present disclosure. Based on the embodiments in the present disclosure, all other embodiments obtained by those ordinary skilled in the art without making creative work shall fall within the scope of the present disclosure.

Figure 1:
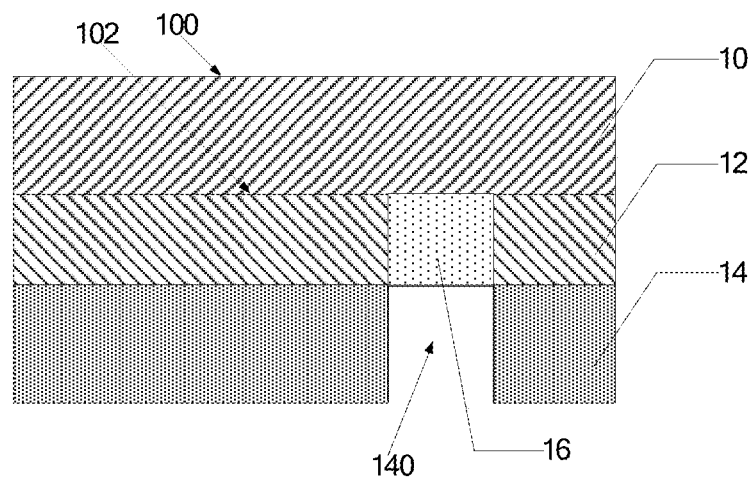
FIG. 1 is a structural schematic view of a display panel according to an embodiment of the present disclosure.

As shown in FIG. 1, FIG. 1 is a structural schematic view of a display panel according to an embodiment of the present disclosure. The display panel may be an OLED display panel, and the like. The display panel includes: a screen body 10, a support film 12, a composite tape 14 and a first reflective film 16.

In detail, the screen body 10 includes a display surface 100 and a non-display surface 102 opposite to the display surface 100. A user may observe displayed content of the screen body 10 from a side of the screen body 10 having the display surface 100. In the present embodiment, the screen body 10 may include a substrate, an array layer, a component layer, a touch layer, and so on, all of which may be laminated successively. The substrate may be a flexible substrate, and material of the substrate may be polyimide (PI), and the like. The screen body 10 formed on the flexible substrate may be flexible to some extent, and may be bent or wound.

The component layer may include an anode, a light-emitting function layer and a cathode. The anode, the light-emitting function layer, and the cathode may be laminated successively. The light-emitting function layer may include a hole injection layer, a hole transport layer, a light-emitting material layer, an electron transport layer, an electron injection layer, and the like, all of which are laminated successively. The hole injection layer is in contact with the anode, and the electron injection layer is in contact with the cathode. By applying an electric field, holes generated by the anode may reach the light-emitting material layer through the hole injection layer and the hole transport layer. Electrons generated by the cathode may reach the light-emitting material layer through the electron injection layer and the electron transport layer. The holes and the electrons in the light-emitting material layer may be recombined to generate an excited state, and the excited state decays to generate light, such that the displayed image is generated on the side of the screen body 10 having the display surface 100. In addition, the component layer of the screen body 10 may also serve as a light source for an optical module, for example, a light source for a fingerprint recognition module.

The support film 12 is arranged on a side of the screen body 10 having the non-display surface 102 for supporting the screen body 10. For example, the support film 12 may be arranged in close contact with a side of the substrate of the screen body 10. Material of the support film 12 may be polyethylene terephthalate (PET), polyimide (PI), and the like. A shape of the support film 12 may be the same as a shape of the side of the screen body 10 having the non-display surface 102.

The composite tape 14 is arranged on a side of the support film 12 away from the screen body 10. The composite tape 14 may include a foam adhesive layer, an anti-static layer, a light-absorbing layer, and the like. The foam adhesive layer may cushion a stress applied on the screen body 10 and protect the screen body 10. The anti-static layer may eliminate static electricity generated, while the screen body 10 is operating, to protect the screen body 10. The light-absorbing layer may absorb the light emitted from the non-display surface 102 of the screen body 10 to reduce an impact on other modules or on the quality of the image displayed on the screen body 10 caused by the light emitted from the back of the screen body 10. Of course, in other embodiments, other functional layers may be configured in the composite tape 14, which will not be limited by the present disclosure.

The first reflective film 16 is disposed in a same layer with the support film 12 and/or the composite tape 14. The first reflective film 16 is arranged corresponding to a perforated region of the display panel. The perforated region is defined to correspond to a location of an external optical module or an external acoustic module. For example, the optical module may be the fingerprint recognition module, a camera module, and the like. The acoustic module may be an earpiece/a speaker module, and the like.

A refractive index of a portion of the display panel corresponding to the perforated region is different from a refractive index of air near the perforated region. When the screen body 10 is self-illuminating, i.e., emitting light, a large amount of reflected light may be generated at an interface between the display panel and the air near the perforated region. The reflected light has a great impact on the quality of the image displayed on the screen body 10, a region of the image corresponding to the perforated region may be dark.

In the present disclosure, the first reflective film 16 is configured at a location corresponding to the perforated region, i.e., the first reflective film 16 is received in the aperture, such that the reflected light caused by the self-illuminance of the screen body 10 may be reduced, the impact on the quality of the image displayed corresponding to the perforated region caused by the self-illuminance of the screen body 10 may be reduced, and a probability of occurring the Mura dark phenomenon may be reduced. In the present disclosure, less material may be required for manufacturing the first reflective film 16, and manufacturing cost may be relatively low.

In an embodiment, the first reflective film 16 is an anti-reflective transmission-enhancement film. The anti-reflective transmission-enhancement film has high light transmittance and low light reflectance. A principle of the anti-reflective transmission-enhancement film is that an interference effect is generated by various optical material film layers to eliminate incident and reflected light, such that the light transmittance may be improved. The first reflective film 16 in this type is relatively mature in the art, may be obtained easily, and may be more effective.

In another embodiment, as shown in FIG. 1, the composite tape 14 is arranged with a perforated region 140, i.e., defines an aperture. The perforated region 140 corresponds to the optical module or the acoustic module. For example, the optical module may be the fingerprint recognition module, the camera module, and the like. The acoustic module may be the earpiece/the speaker module, and the like. The optical module or the acoustic module may be received in the perforated region 140 or disposed on a side of the perforated region 140 away from the support film 12. A portion of the support film 12 corresponding to the location of the perforated region 140 defines a hole. The first reflective film 16 is received in the hole. On one hand, in this way, a thickness of the display panel may not be increased, a structure of the display panel may be simple, and a process of manufacturing the display panel may be easily achieved. On the other hand, the composite tape 14 generally includes a light-absorbing layer. Therefore, the reflected light, which is generated at a portion of the composite tape 14 that does not define the aperture and is generated by self-illumination of the screen body 10, is less. The reflected light, which is generated at the interface between the perforated region and the air and is generated by self-illumination of the screen body 10, is large. Therefore, the image displayed on a portion of the screen body 10 corresponding to the perforated region may be dark obviously. In the present disclosure, receiving the first reflective film 16 in the hole of the support film 12 corresponding to the perforated region may reduce the reflected light at the perforated region, and the darkness of the image displayed at the location corresponding to the perforated region may be avoided.

When the perforated region corresponds to the fingerprint recognition module, the light emitted by the screen body 10 is a light source of the fingerprint recognition module. The fingerprint recognition module generally includes a transistor and a photodiode. When a finger touches the fingerprint recognition module, a valley and a ridge of the fingerprint show different reflection intensities against the light emitted by the screen body 10, such that two ends of the photodiode at positions corresponding to the valley and the ridge produce different voltage drops, and therefore, different current values are generated. Based on the different current values, corresponding positions of the valley and the ridge may be identified, such that a fingerprint signal of the finger is obtained.

As the composite tape 14 usually includes the light-absorbing layer, in order to improve the accuracy of the fingerprint recognition module, a portion of the composite tape 14 corresponding to the fingerprint recognition module needs to define the aperture to allow the light emitted from the screen body 10 to reach the fingerprint recognition module. Further, as the refractive index of the air in the aperture and the refractive index of the screen body 10 are different, at an intersection of the screen body 10 and the air, the light emitted by the screen body 10 is reflected, only a small amount of the light emitted by the screen body 10 may reach the fingerprint recognition module, such that a recognition ability of the fingerprint recognition module may be affected. In order to solve the technical problem, the first reflective film 16 is provided at the position of the support film 12 corresponding to the perforated region 140. The first reflective film 16 may increase intensity of the light that is emitted by the screen body 10 and reaches the fingerprint recognition module, such that the recognition ability of the fingerprint recognition module is improved.

Figure 2:
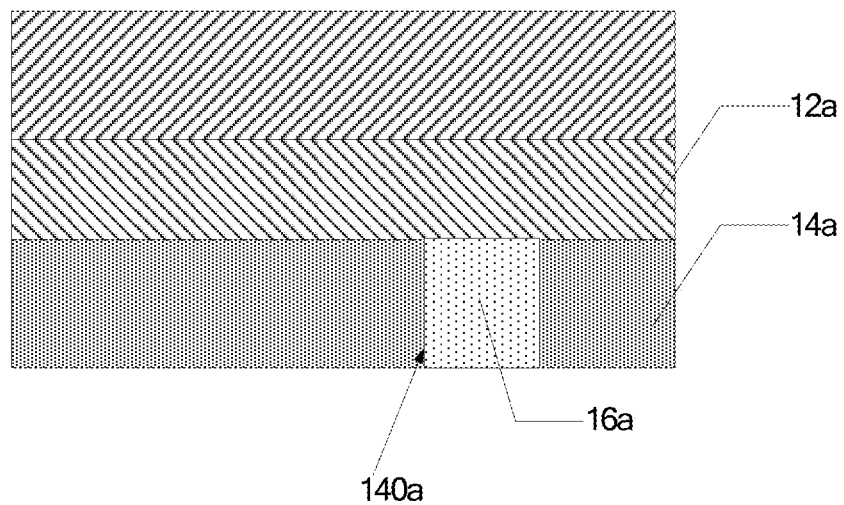
FIG. 2 is a structural schematic view of a display panel according to another embodiment of the present disclosure.
Figure 3:
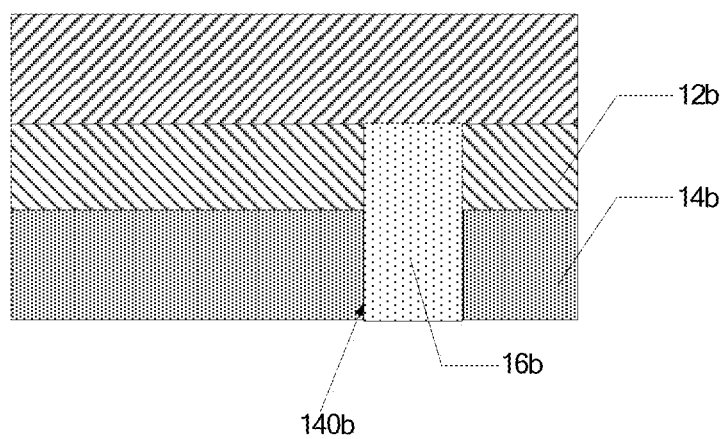
FIG. 3 is a structural schematic view of a display panel according to still another embodiment of the present disclosure.

In addition, as shown in FIG. 2, FIG. 2 is a structural schematic view of a display panel according to another embodiment of the present disclosure. When the optical module or the acoustic module is disposed on the side of the perforated region 140a away from the support film 12a, the first reflective film 16a may also be received in the perforated region 140a, and the portion of the support film 12a corresponding to the perforated region 140a does not need to define a hole. Alternatively, as shown in FIG. 3, FIG. 3 is a structural schematic view of a display panel according to still another embodiment of the present disclosure. The first reflective film 16b may also be received in the perforated region 140b of the composite tape 14b and in the hole of the support film 12b.

In an application scenario, shown in FIG. 1, an orthographic projection of the first reflective film 16 on the screen body 10 covers an orthographic projection of the perforated region 140 on the screen body 10, i.e., orthographic projection of the first reflective film 16 on the screen body 10 covers an orthographic projection of a wall of the aperture 140 on the screen body 10. For example, the orthographic projection of the first reflective film 16 on the screen body 10 coincides exactly with the orthographic projection of wall of the perforated region 140 on the screen body 10. Alternatively, the orthographic projection of the first reflective film 16 on the screen body 10 exceeds the orthographic projection of the wall of the perforated region 140 on the screen body 10. In this way, it is ensured that the perforated region 140 is covered by the first reflective film 16 as much as possible while the amount of material for manufacturing the first reflective film 16 is reduced, such that the quality of the image displayed in all regions of the screen body 10 corresponding to the perforated region 140 may be improved.

In addition, the orthographic projection of the wall of the perforated region 140 or a wall of the hole on the screen body 10 is any one of circular, elliptical, rectangular, rounded rectangular, diamond-shaped, or triangular. That is, in the present disclosure, the shape of the perforated region 140 and the aperture may be determined arbitrarily.

Further, an adhesive layer (not shown in the figure) is disposed between the first reflective film 16 and an inner wall of the hole. Material of the adhesive layer may be optically clear adhesive (OCA), and the like. The OCA is colorless and transparent, the light transmission rate is above 90%, and an adhesive strength of the OCA is high. By configuring the adhesive layer in this way, the first reflective film 16 and the inner wall of the hole may be adhered more tightly, reducing a probability of the first reflective film 16 falling off from the hole. Of course, as shown in FIG. 1, an adhesive layer similar to the OCA may also be disposed between the first reflective film 16 and the screen body 10. In addition, when the optical module or the acoustic module is received in the perforated region 140 of the composite tape 14, an adhesive layer similar to the OCA may also be disposed between the first reflective film 16 and the optical module or the acoustic module. A process of forming the above structure may include: disposing the adhesive layer on a surface of the first reflective film 16 or on the inner wall of the hole; and disposing the first reflective film 16 in the hole. In addition, in the present embodiment, a proportion of the above-mentioned adhesive layer may not be too high, as long as the first reflective film 16 can be fixedly received in the hole, such that a space of the hole may not be occupied too much.

Of course, in other embodiments, between the first reflective film 16 and the inner wall of the hole, the adhesive layer may be omitted. In this case, a process of forming the structure may include: performing a vacuum evaporation coating process or a magnetron sputtering coating process to form the first reflective film 16 in the hole; alternatively, performing a coating process and a curing process to form the first reflective film 16 in the hole.

Figure 4:
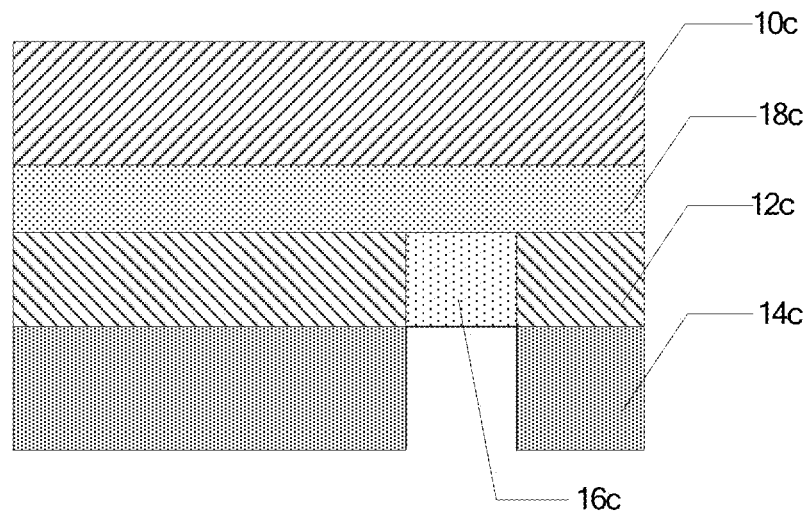
FIG. 4 is a structural schematic view of a display panel according to still another embodiment of the present disclosure.

In another embodiment, as shown in FIG. 4, FIG. 4 is a structural schematic view of a display panel according to still another embodiment of the present disclosure. The display panel further includes a second reflective film 18c. The second reflective film 18c is disposed only between the screen body 10c and the support film 12c (as shown in FIG. 4). Alternatively, the second reflective film 18c is disposed only between the support film 12c and the composite tape 14c. Alternatively, the second reflective film 18c is disposed between the screen body 10c and the support film 12c and between the support film 12c and the composite tape 14c. When the second reflective film 18c is disposed between the screen body 10c and the support film 12c, a possibility of uneven brightness of the image displayed on the screen body 10c caused by the reflected light generated by the support film 12c may be reduced. When the second reflective film 18c is disposed between the support film 12c and the composite tape 14c, a possibility of uneven brightness of the image displayed on the screen body 10c caused by the reflected light generated by the composite tape 14c may be reduced.

As shown in FIG. 4, the first reflective film 16c directly contacts the second reflective film 18c. In this way, the structure of the display panel is simplified and may be achieved easily. While manufacturing the display panel, the first reflective film 16c and the second reflective film 18c may be formed continuously.

Further, in the present embodiment, the second reflective film 18c may be an anti-reflective transmission-enhancement film. Preferably, material of the second reflective film 18c is the same as the material of the first reflective film 16c. In this way, complexity of manufacturing the display panel may be reduced.

In the present embodiment, a surface of the above-mentioned second reflective film 18c that contacts a surrounding film layer may be arranged with an adhesive layer, such as optical adhesive and the like. While manufacturing, the second reflective film 18c may be entirely adhered to the surrounding film layer through the adhesive layer. Alternatively, the second reflective film 18c may be entirely vacuum-adsorbed to the surrounding film layer through the adhesive layer. Of course, in other embodiments, the second reflective film 18c may directly contact the surrounding film layer, and the second reflective film 18c may be arranged directly on the surrounding film layer by the vacuum evaporation coating process, the magnetron sputtering process, or the coating process.

Figure 5:
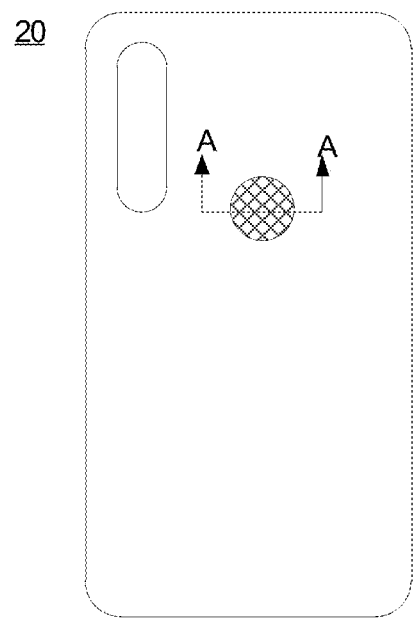
FIG. 5 is a structural schematic view of a display apparatus according to an embodiment of the present disclosure.
Figure 6:
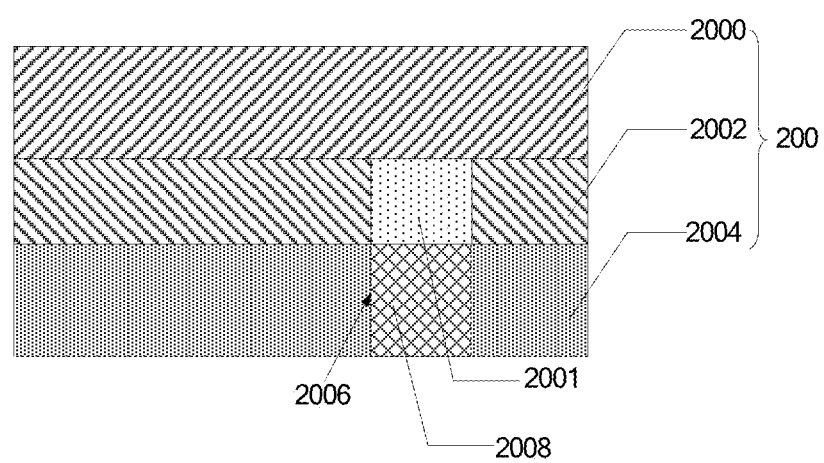
FIG. 6 is a cross section view of the apparatus shown in FIG. 5, taken along a line A-A, according to an embodiment of the present disclosure.

As shown in FIGS. 5-6, FIG. 5 is a structural schematic view of a display apparatus according to an embodiment of the present disclosure, and FIG. 6 is a cross section view of the apparatus shown in FIG. 5, taken along a line A-A, according to an embodiment of the present disclosure. In FIG. 5, the display apparatus 20 is a mobile terminal, and a structural schematic view of the mobile phone having the fingerprint recognition module on a back of the mobile phone is shown. The display apparatus 20 may include the display panel 200 as described in any one of the above embodiments. The display panel 200 includes a screen body 2000, a support film 2002, and a composite tape 2004, which are laminated successively. The display panel 200 is configured with a perforated region 2006. For example, the perforated region 2006 is defined in the composite tape 2004 of the display panel 200. The display apparatus 20 further includes an optical module 2008 or an acoustic module. A position of the optical module 2008 or the acoustic module corresponds to the perforated region 2006. A position of the first reflective film 2001 arranged in the display panel 200 also corresponds to the perforated region 2006.

In an embodiment, the optical module 2008 or the acoustic module is received in the perforated region 2006 of the composite tape 2004. Along a direction extending from the screen body 2000 to the support film 2002, a portion of the support film 2002 corresponding to the perforated region 2006 defines a hole (not labeled). The first reflective film 2001 is received in the hole. That is, the first reflective film 2001 is disposed in a same layer as the support film 2002, and is disposed at a position corresponding to the perforated region 2006.

The above description shows only an implementation of the present disclosure, and does not limit the scope of the present disclosure. Any equivalent structure or equivalent process transformation based on the content of the specification and the accompanying drawings, directly or indirectly applied in other related technical field, shall be included in the scope of the present disclosure.

What is claimed is:

1. A display panel comprising:
a screen body, comprising a display surface and a non-display surface disposed opposite to the display surface;
a support film, disposed on the non-display surface of the screen body;
a composite tape, disposed on a side of the support film away from the screen body; and
a first reflective film, disposed in a same layer as the support film, wherein, in a thickness direction of the display panel, the first reflective film overlaps a perforated region of the display panel corresponding to an external optical module or an external acoustic module, the external optical module comprises a fingerprint recognition module or a camera module, and the external acoustic module comprises an earpiece or a speaker module;
wherein the first reflective film and the composite tape are disposed in a same layer, and the first reflective film is an anti-reflective transmission-enhancement film;
the first reflective film on the screen body coincides with the perforated region along the thickness direction;
the perforated region is disposed in the composite tape, a portion of the support film defines a hole corresponding to the perforated region along the thickness direction, and the first reflective film is received directly in the hole.

2. The display panel according to claim 1, wherein the perforated region or the hole is shaped in any one of circular, elliptical, rectangular, a rounded rectangular, diamond-shaped, or triangular.

3. The display panel according to claim 1, wherein an adhesive layer is disposed between the first reflective film and an inner wall of the hole.

4. The display panel according to claim 1, wherein the perforated region is disposed in the composite tape, and the first reflective film is received in the perforated region.

5. The display panel according to claim 1, wherein the perforated region is disposed in the composite tape, a portion of the support film defines a hole corresponding to the perforated region along the thickness direction, and the first reflective film is received in both the perforated region and the hole.

6. The display panel according to claim 1, further comprising:
a second reflective film, wherein the second reflective film is disposed between the screen body and the support film and/or disposed between the support film and the composite tape.

7. The display panel according to claim 6, wherein the first reflective film directly contacts the second reflective film.

8. The display panel according to claim 6, wherein the second reflective film is an anti-reflective transmission-enhancement film.

9. The display panel according to claim 8, wherein material of the first reflective film is the same as material of the second reflective film.

10. The display panel of claim 9, wherein the screen body comprises a substrate, an array layer, and a component layer, which are laminated successively;
the component layer comprises an anode, a light-emitting function layer, and a cathode; the anode and the first reflective film are disposed in different layers, the cathode and the first reflective film are disposed in different layers, and the light-emitting function layer and the second reflective film are disposed in different layers.

11. The display panel according to claim 6, wherein a plurality of adhesive layers is disposed on two sides of the second reflective film along the thickness direction.

12. A display apparatus, comprising:
the display panel according to claim 1; and
the optical module or the acoustic module, provided at a position corresponding to the perforated region, wherein the screen body comprises a substrate, an array layer, a component layer, and a touch layer, which are laminated successively, the component layer comprises an anode, a light-emitting function layer and a cathode, the external optical module is a fingerprint recognition module or a camera module, and the external acoustic module is an earpiece or a speaker module.

13. The display panel of claim 1, wherein the external optical module comprises the fingerprint recognition module and the screen body is configured to serve as a light source for the fingerprint recognition module.

14. The display panel of claim 13, wherein the first reflective film is configured to increase an intensity of light emitted by the screen body that reaches the fingerprint recognition module.

15. The display panel of claim 1, wherein the screen body comprises a substrate, an array layer, and a component layer, which are laminated successively, the component layer comprises an anode, a light-emitting function layer and a cathode, and the anode and the first reflective film are disposed in different layers.

16. The display panel of claim 1, wherein the anti-reflective transmission-enhancement film has high light transmittance and low light reflectance.

17. The display panel of claim 1, wherein the composite tape defines another hole communicating with the hole of the support film, and the external optical module is received directly in the hole of the composite tape.

18. The display panel of claim 1, wherein the composite tape defines another hole communicating with the hole of the support film, a portion of the first reflective film is received directly in the hole of the composite tape, and another portion of the first reflective film is received directly in the hole of the support film.

19. The display panel of claim 1, wherein the fingerprint recognition module comprises a transistor and a photodiode.

\* \* \* \* \*